Figure 1:
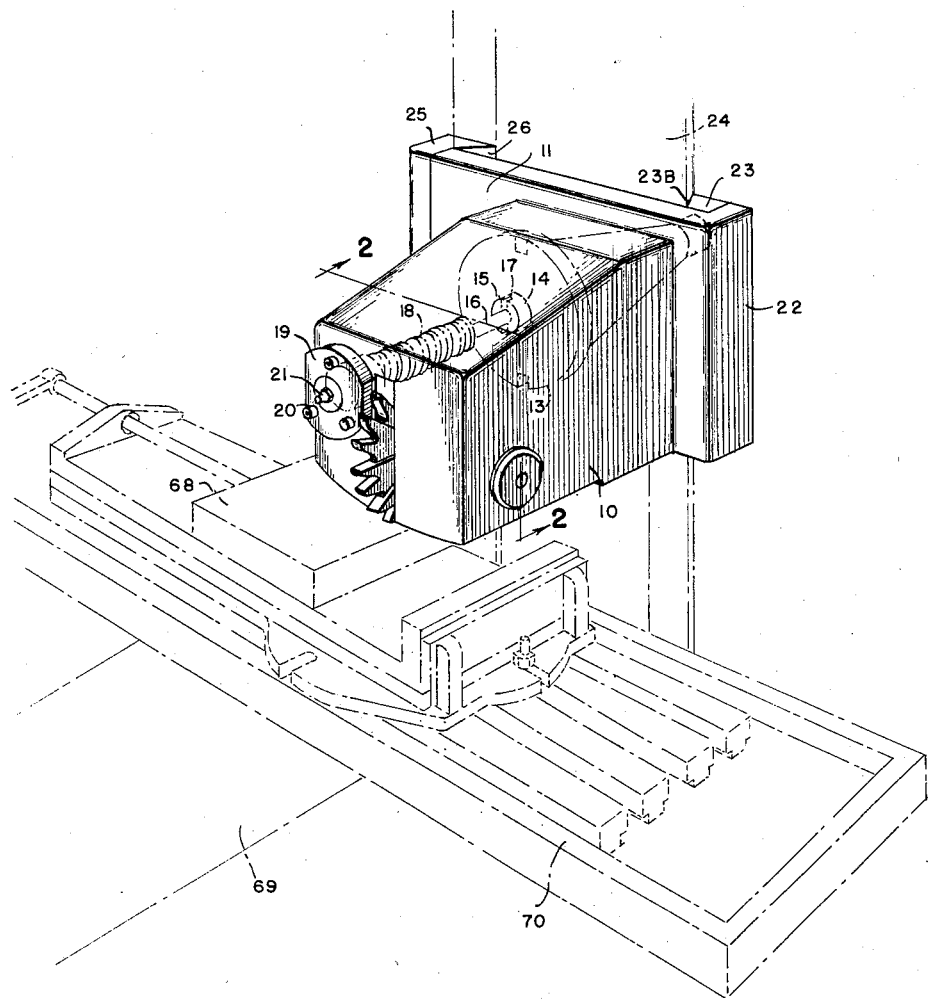

Nov. 10, 1959  M. P. BUDNEY ET AL  2,911,885
MILLING ADAPTER HEAD

Filed April 13, 1956  2 Sheets-Sheet 1

INVENTORS
M. P. BUDNEY
H. S. BUDNEY
T. W. BUDNEY
M. F. SACZAWA
BY *Ayato Dowell*
ATTORNEYS

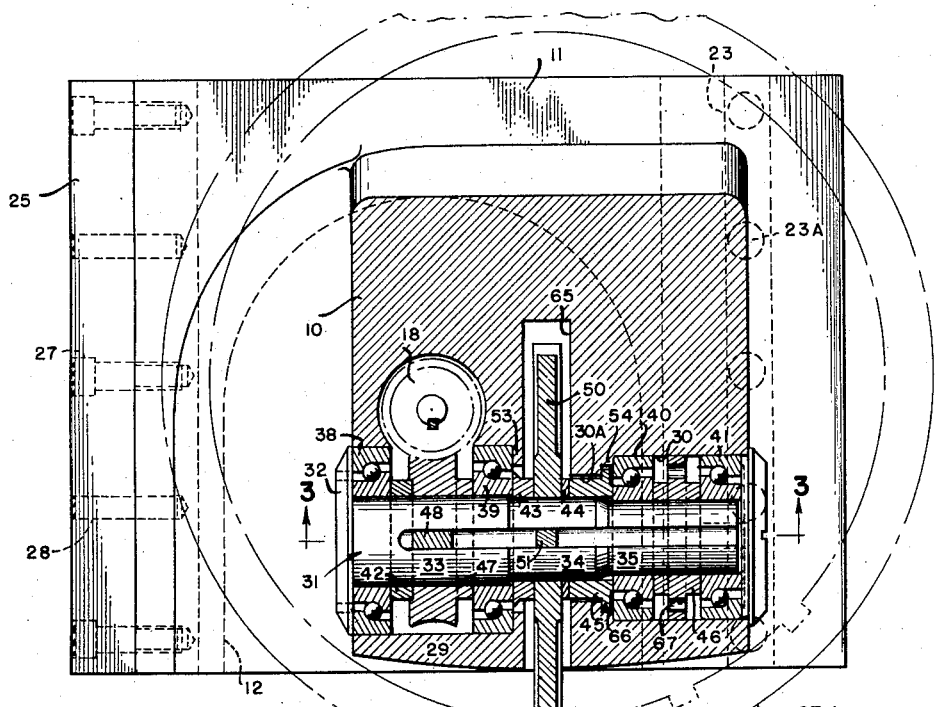
FIG. 2
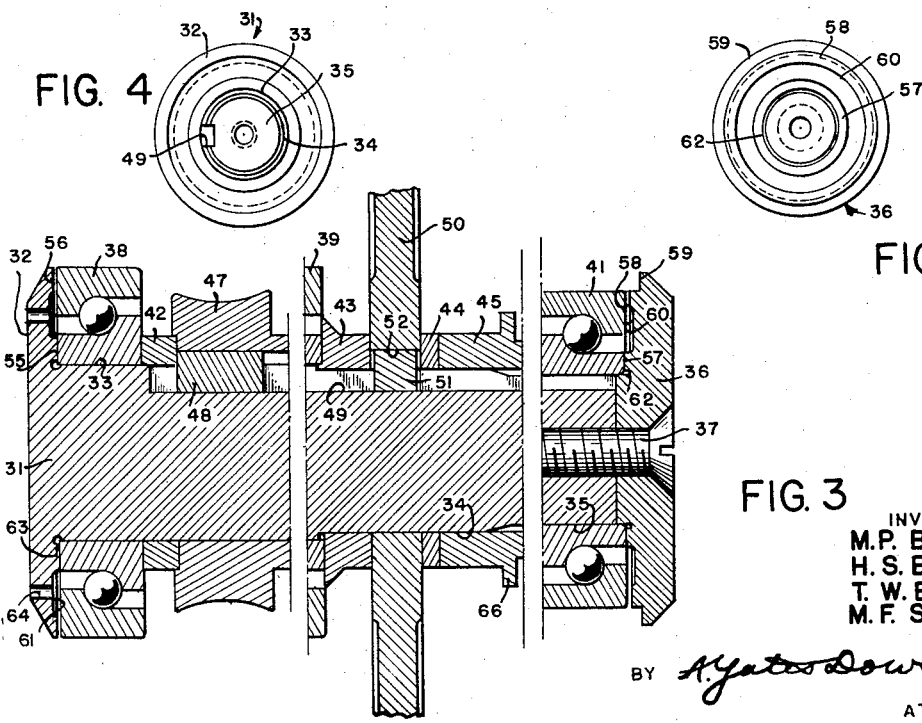
FIG. 4
FIG. 5
FIG. 3
INVENTORS
M. P. BUDNEY
H. S. BUDNEY
T. W. BUDNEY
M. F. SACZAWA
BY A. Yates Dowell
ATTORNEYS

United States Patent Office 2,911,885
Patented Nov. 10, 1959

2,911,885

MILLING ADAPTER HEAD

Michael P. Budney, Berlin, Henry S. Budney and Thaddeus W. Budney, Newington, and Matthew F. Saczawa, Wethersfield, Conn., assignors to Atlantic Machine Tool Works, Inc., Newington, Conn.

Application April 13, 1956, Serial No. 578,006

5 Claims. (Cl. 90—11)

The present invention relates to the shaping of solid material such as metal by a rotating toothed cutter and particularly to an attachment for a milling machine for obtaining a cutting action at substantially right angles to the normal cutting action of a milling machine.

Heretofore conventional milling machines found in most machine shops have served a variety of uses such as cutting keyways in shafts, teeth in gears or the like, but these previously-known milling machines have not been satisfactory for producing a groove parallel to the axis of curvature of a concave surface such as a hollow annular body having a small radius of curvature. The need for such a cutter has been acute in the manufacture of jet engines in which grooves or slots are required on the inner or concave surface of rings used in such jet engines.

Broaching has been suggested to produce the internal grooves or slots, but the reciprocating action of broaches is necessarily a slow speed operation and the use of milling cutters has many advantages thereover.

An object of the present invention is to solve the problem of providing slots or grooves on concave surfaces of hollow objects such as cylinders, hoops, rings or the like by the use of milling cutters and to overcome the difficulties experienced with previously-known equipment.

Another object of the invention is to provide a simple and effective drive for a milling cutter arranged at right angles to the normal cutter position of milling machines.

A further object is to provide a readily usable attachment for conventional milling machines which will change such milling machines to a special machine for obtaining axial slots or grooves on hollow concave members.

Another object is to provide an efficient closed drive for a milling cutter in which the milling cutter is accurately maintained in correct position for high accuracy.

A further object is to provide a milling machine attachment which can be effectively lubricated without danger of coolant fluids carrying abrasive material into the bearings.

Other objects and advantages of the invention will be apparent from the following description taken in conjunction with the accompanying drawing wherein:

Figure 1 is a perspective of the milling machine adapter head applied to a milling machine shown in phantom with the work supporting carriage also shown in phantom, parts being omitted for simplicity;

Figure 2, a vertical section taken substantially on plane 2—2 of Figure 1 showing the arbor with its bearings and spacers and the worm drive therefor with a milling cutter located centrally and showing a ring-shaped work piece in phantom lines;

Figure 3, an enlarged fragmentary section taken substantially on line 3—3 of Figure 2 showing the arbor in section through the keyway thereof;

Figure 4, an end view of the arbor shaft that carries the milling cutter as seen from the unflanged end thereof; and Figure 5, an elevational view of the retaining cap for the unflanged end of the arbor as seen from the inner face thereof.

Briefly stated, the present invention relates to a milling machine adapter head comprising a body having a laterally projecting flange with undercut guides on the flange for cooperation with the complemental shaped track at the front of the milling machine which provides for removable attachment to a milling machine. A drive shaft carrying a worm and having means for driving engagement with the arbor driving shaft of a milling machine is rotatably mounted in the adapter head body whereby the attachment drive shaft will be operated. An arbor having a cutter centrally positioned nad keyed thereon is rotatably mounted in suitable bearings in the adapter head and is driven by a worm gear keyed on the arbor and cooperating with the worm on said drive shaft, the arbor being suitably mounted in anti-friction bearings and retained in accurate position relative to the adapter head during operation for accurate cutting on the work supported on the table of the milling machine. The attachment body is generally symmetrical about the cutter to provide for cutting from the interior a groove or slot on a convex surface having a small radius of curvature.

Referring more particularly to the drawing, the adapter head of the present invention includes a main body 10 having a flange 11 at the rear end thereof extending upwardly and laterally therefrom, said body 10 being provided with a recess 12 extending inwardly from the rear and bottom to receive the projecting boss 13 of a milling machine. Centrally of the boss 13 a hub 14 fixed to the conventional arbor driving shaft of a milling machine has a slot 15 extending therethrough which receives a drive shaft 16 of the adapter, the drive shaft 16 having a pin 17 for cooperation with the slot for positive driving the drive shaft 16. The shaft 16 is supported in suitable bearings 16A and 16B, and carries a worm 18 keyed thereon, the shaft 16 and the bearings thereon being removably retained in the body 11 by means of a cap 19 secured to the body by conventional screw stud bolts and nuts 20 and being lubricated by means of a fitting 21.

The attachment body 10 is fixed to the milling machine by means of a rib 22 projecting rearwardly from the flange 11 for locating a trapezoidal-shaped guide block 23 which is fixed to the flange 11 by bolts or the like 23A. The inner edge of the block 23 is undercut or dovetailed providing a surface 23B engaging one complemental edge of a track 24 of the milling machine. A removable attaching angle 25 is undercut providing a surface 26 for dovetailed engagement with the other edge of the track 24, the angle guide 25 being secured by suitable machine screws 27 and maintained in alignment by studs 28 for assisting in the assembly thereof. It will be evident that the guide block 23 and the attaching angle guide 25 may be fixed relative to the milling machine by the proper fit thereof to maintain the adapter head in operative position.

The body 10 is provided with a bore therethrough below the attachment drive shaft 16 and transverse thereto, such bore including a first section 29 of large diameter at one end and a section 30 of small diameter at the other end and an intermediate section 30A therebetween of different diameters as explained hereinafter. A milling cutter supporting shaft or arbor 31 having a flange 32 integral therewith at one end has an adjacent section 33 of the shaft of relatively large diameter, an intermediate section 34 of intermediate diameter and a section 35 of smaller diameter adjacent the other end of the shaft. A cap 36 is secured to the small end 35 of the arbor shaft 31 being retained thereon by means of a counter-sunk flatheaded screw 37.

The arbor shaft 31 is rotatably mounted in the body 10 by a plurality of anti-friction bearings 38, 39, 40, and 41. A plurality of spacer washers 42, 43, 44, 45, 46, a worm gear 47 keyed by means of key 48 in a keyway 49 to the shaft 31 for fixing the worm gear against rotation, and a conventional milling cutter 50 keyed by a key 51 in keyway 49 of the shaft and a keyway 52 of the milling cutter are clamped together on arbor shaft 31 with the inner races of the bearings 38, 39, 40 and 41 between flange 32 and cap 36 and fixed against axial movement on the arbor shaft 31 by screw 37. The outer race of bearings 39 and 40 abut against shoulders 53, 54, respectively, the bearings 39 and 40 being arranged to withstand axial thrust. The spacing washers 43, 44, and 45 with the cutter 50 are of proper thickness to permit the outer races of bearings 39 and 40 to abut the shoulders 53 and 54 respectively. The flange 32 of the shaft 31 is provided with an annular rib 55 which abuts the inner race of bearing 38, such annular rib 55 projecting axially inwardly of an annular surface 56 of greater diameter, the difference in elevations of such rib and surface being three thousandths of an inch, for example, from the outer race of bearing 38 thereby permitting proper alignment and free rotation. The cap 36 is provided with a rib 57 similar to rib 55 engaging the inner race of bearing 41, while an annular surface 58 is spaced a small amount such as three thousandths of an inch from the outer race of bearing 41 to provide for a slight clearance, a second annular surface 59 overlying the outer surface of the body 10 adjacent the bore 30 to prevent the entry of objectionable material into the bearing. The cap 36 and flange 32 are provided with annular grooves 60, 61 respectively, and undercuts 62 and 63 respectively to provide for proper clearance, the flange 32 also being provided with a plurality of apertures 64 serving as wrenching surfaces when the screw 37 is tightened or loosened during assembly of the arbor.

For the purpose of changing the cutter 50 and for other considerations such as lubrication, the attachment may be disassembled by removing the screw 37 and the cap 36 and withdrawing the arbor 31 to the left or in the direction of the flange 32, the cutter 50 being located in an enlarged recess 65 cannot be moved axially and when the arbor shaft 31 is moved toward the left, as seen in the drawings, the shaft sections 34 and 35 are withdrawn from the cutter 50, spacers 44, 45, bearing 40, spacer 46 and bearing 41, a shoulder 66 on spacer 45 engaging a cooperating shoulder in the body 10 to prevent such spacer 45 from being drawn to the left and therefore requiring the removal of such spacer to the right. The spacer 46 is provided with a plurality of openings 67 for the passage of lubricant.

The worm 18 is removable along with its drive shaft 16 and bearings 16A, 16B by removal of studs and nuts 20 holding the cap 19 in position, the worm with its shaft being withdrawn and releasing shaft 16 and pin 15 from hub 14. After removal of such worm, the worm gear 47 may be withdrawn along with the shaft 31 and as soon as the shaft section 35 is withdrawn from cutter 50, the cutter may be removed by radial movement of such cutter through the slot or recess 65. The spacers 44, 45, bearings 40, spacer 30 and bearing 41 may remain in the body 10. It will be observed that the annular spacing washers 40, 43, and 44 serve to maintain the keys 48 and 51 in operative position since the spacing washers do not have key slots.

The invention is particularly useful in providing slots on concave surfaces such as hoops or rings 67A, the attachment body 10 being of minimum dimensions as shown in Figure 2 to accommodate small diameter rings. The work is retained on the feed table by a suitable jig such as a vise 68 or the like and fed by longitudinally movable feed tube 69 in a well-known manner and adjusted by transversely movable table 70 which supports the vise 68.

It will be obvious to those skilled in the art that various changes may be made in the invention without departing from the spirit and scope thereof and therefore the invention is not limited by that which is illustrated in the drawing and described in the specification but only as indicated in the accompanying claims.

What is claimed is:

1. A milling adapter head comprising a base, a body projecting from the base and supported thereby, said body having a tool receiving recess opposite said base for receiving a milling cutter, said body having an arbor shaft receiving bore extending transversely to said body and passing through said tool receiving recess, said bore having one end portion of large diameter and the other end portion of smaller diameter and having abutment means between said large portion and said recess and abutment means between said small portion and said recess, said abutment means comprising shoulders fixed to said body and directed radially inwardly of said bore, each forming opposite abutment surfaces facing axially of said bore, an arbor having a large cylindrical section within said large bore portion, having an intermediate cylindrical section located within the recess in between said abutment means and a small cylindrical section within the small bore portion of said body, a first large anti-friction thrust bearing having its outer race engaging the abutment means of said large bore and its inner race engaging the large cylindrical section, a first small anti-friction bearing for said small bore having its outer race engaging said abutment means of said small bore and its inner race engaging the small cylindrical section, a cutter mounted on and keyed to the intermediate section within said recess, spacers on each side of said cutter engaging the cutter and the inner races of both of said first anti-friction thrust bearings, a worm gear keyed to said large arbor section outwardly of said first large anti-friction bearing, a second large anti-friction bearing outwardly of said worm gear on said large section, a retainer flange on the free end of said large cylindrical section engaging the inner race of the second large anti-friction bearing, a second small anti-friction bearing spaced outwardly of said first small anti-friction bearing by spacing elements, and a retainer cap removably secured to the free end of said small arbor section engaging the inner race of said second small anti-friction bearing, said retainer flange and retainer cap and said second anti-friction bearings being so constructed as to provide an impositive engagement between the retainer and their respective cooperating outer races, whereby when said cap is secured in position said arbor is positively prevented from axial movement by the action of the inner races and spacing elements and worm gear and said abutment means to provide an accurate cutting path for the teeth of said milling cutter.

2. A milling adapter head comprising a base, a body projecting from the base and supported thereby, said body having a tool receiving recess opposite said base for receiving a milling cutter, said body having an arbor shaft receiving bore extending transversely to said body and passing through said tool receiving recess, said bore having one end portion on one side of said recess and the other end portion on the other side of said recess, abutment means between said one end portion and said recess and abutment means between said other end portion and said recess, said abutment means comprising shoulders fixed to said body and directed radially inwardly of said bore, each forming opposite abutment surfaces facing axially of said bore, an arbor extending through said bore and recess, a first anti-friction thrust bearing having its outer race engaging the abutment means of said first portion and its inner race encircling said arbor, a first anti-friction thrust bearing having its outer race engaging the abutment means of said other portion and its inner race encircling said arbor, a cutter mounted on and keyed to the section of said arbor within said recess, spacers on each side of said cutter engaging the cutter and the inner races of both of said first anti-friction thrust bearings, a worm gear mounted on and keyed to said arbor within the first portion of said bore, a second anti-friction bearing outwardly of said worm gear on said arbor, a retaining flange on the free end of said arbor engaging the inner race of said second anti-friction bearing, a second anti-friction bearing spaced outwardly of said first anti-friction bearing that lies in said other portion by spacing elements, and a retaining cap removably secured to the free end of said arbor section engaging the inner race of said second mentioned second anti-friction bearing, said retainer flange and retainer cap and said second anti-friction bearings being so constructed as to provide an impositive engagement between the retainers and their respective cooperating outer races, whereby when said cap is secured in position said arbor is positively prevented from axial movement by the action of the inner races and spacing elements and worm gear and said abutment means to provide an accurate cutting path for the teeth of said milling cutter.

3. The structure according to claim 1 including a second recess in line with said worm gear and a worm drive mounted in said second recess.

4. The invention according to claim 2 in which the spacing element on the other side of the cutter adjacent the other bore portion is provided with a flange which engages the abutment means in the other bore portion to assure that the flange and its associated spacer must be removed through the said other bore portion to provide for easy insertion and removal of the milling cutter.

5. The invention according to claim 2 in which the gear is effectively separated from the cutter receiving recess and the body provides a substantially lubricant tight housing.

References Cited in the file of this patent

UNITED STATES PATENTS

| | | |
|---|---|---|
| 68,654 | Rominger | Sept. 10, 1867 |
| 2,493,473 | Bouchard | Jan. 3, 1950 |
| 2,588,459 | Annen | Mar. 11, 1952 |
| 2,703,498 | Tree | Mar. 8, 1955 |

FOREIGN PATENTS

| | | |
|---|---|---|
| 693,026 | Great Britain | June 17, 1953 |